Jan. 27, 1931.  A. G. GIRARD  1,790,344
AUTOMOBILE DECKING
Filed Aug. 1, 1922
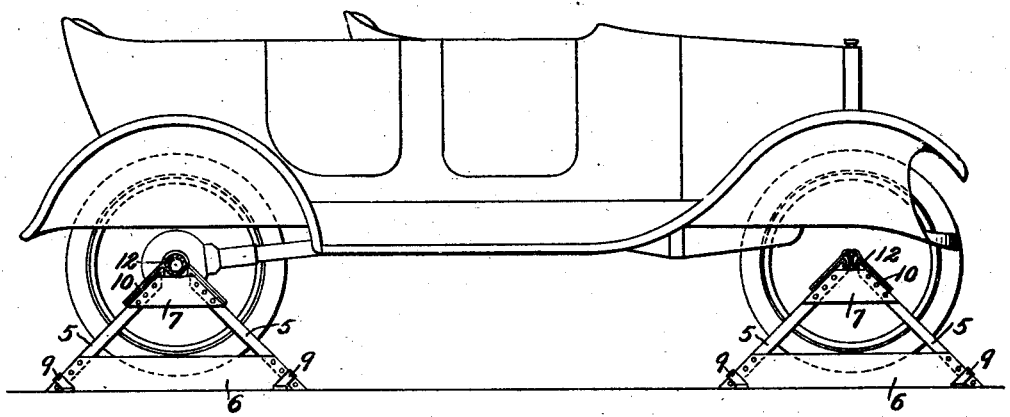
Fig. I.
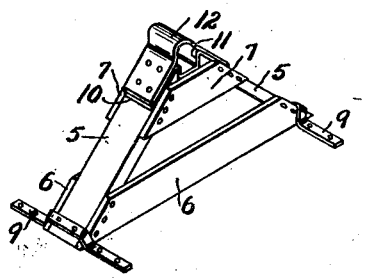
Fig. II.
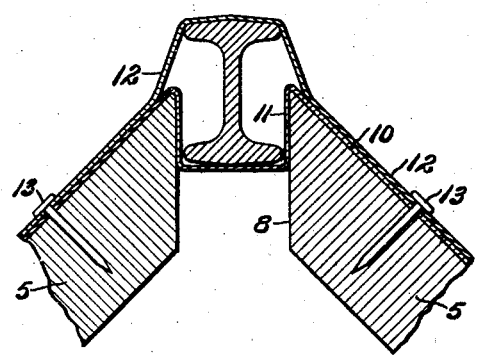
Fig. III.
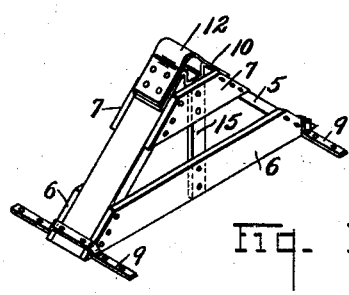
Fig. IV.
INVENTOR.
Arthur G. Girard
BY Chester W. Braselton
Solon J. Boughton
ATTORNEYS.

Patented Jan. 27, 1931

1,790,344

UNITED STATES PATENT OFFICE

ARTHUR G. GIRARD, OF TOLEDO, OHIO, ASSIGNOR TO THE WILLYS-OVERLAND COMPANY, OF TOLEDO, OHIO, A CORPORATION OF OHIO

AUTOMOBILE DECKING

Application filed August 1, 1922. Serial No. 578,882.

This invention relates to a device adapted for use in supporting a motor vehicle in a railroad car for shipment. An object of this invention is to provide supports for the axles of the motor vehicle which shall be simple, efficient and easily applied, yet inexpensive to manufacture.

In the accompanying drawing, Figure I is a side elevation of a motor vehicle, the front and rear axles being in section to more clearly show my invention applied thereto.

Fig. II is a perspective view of one of the supporting frames.

Fig. III is a sectional view of the upper portion of a supporting frame, and

Fig. IV is a view similar to Fig. II showing a modified form.

The same reference numbers refer to the same parts throughout the views.

The supporting frames illustrated in Figs. I and II each comprise two wooden legs 5. secured together at the bottom by a pair of wooden side plates 6 and at the top by a pair of similar but shorter plates 7, the plates and legs being preferably nailed together and forming a triangular or A-shaped support. The upper ends of the legs 5 are cut off diagonally so that in the completed frame the end faces 8 are substantially vertical and are spaced a somewhat greater amount than the width of the axle. The lower ends of the legs are also shown beveled to fit the floor of the freight car, to which they may be nailed. Additional securing means are provided comprising metal strips 9 which pass over the lower ends of the legs and are then bent down to rest on the floor. These strips are preferably nailed to both the legs and the car floor. At the top of the frame two metal strips or brackets are used. The inner strip 10 fits over the upper ends of the legs and is provided with a channel portion 11 between the adjacent end faces of the legs, which portion is adapted to receive the automobile axle. The outer strip 12 is bent to fit over the axle and both strips are securely fastened down to the legs of the frame as by nails 13. The side members 7 and the inner strips 10 may be so positioned relative to each other that either shall carry the axle while the one may be depended upon to support the axle in case of failure of the other. However, a preferable arrangement is to have the weight of the automobile divided between the side members and the strips 10 so that the axle is supported jointly by these two members.

In the modified form illustrated by Fig. IV, the frame has an additional member 15 which stands upright between the legs 5. This member is shown nailed to the side plates 6 and 7 and may also assist in carrying the axle.

While I have shown and described in detail a particular structural embodiment as illustrative of my invention, I do not wish to be limited thereby, since various changes might be made therein without departing from the scope of the invention covered by the appended claim.

Having thus described my invention, what I claim as new and desire to secure by Letters Patent, is:

A support for a motor vehicle comprising in combination two inclined legs, a pair of plates joining said legs together at their upper ends, said upper ends being spaced apart to receive and to enable said plates to support an axle of said motor vehicle, a sheet metal strip attached to the outer sides of said legs and bent to loop under said axle and in engagement with the adjacent faces of the legs and a second sheet metal strip similarly attached to said legs and passing over said axle.

In testimony whereof, I affix my signature.

ARTHUR G. GIRARD.